(12) United States Patent
Walker et al.

(10) Patent No.: US 11,416,888 B1
(45) Date of Patent: Aug. 16, 2022

(54) SYSTEM FOR SUGGESTING COMPLIANT DIGITAL PROMOTION FOR A REGULATED PRODUCT AND RELATED METHODS

(71) Applicant: INMAR CLEARING, INC., Winston-Salem, NC (US)

(72) Inventors: Jess D. Walker, Georgetown, TX (US); Bryan Bartow, Leander, TX (US); David E. Johnson, Cedar Park, TX (US); Chris Rebstock, Round Rock, TX (US)

(73) Assignee: INMAR CLEARING, INC., Winston-Salem, NC (US)

(*) Notice: Subject to any disclaimer, the term of this patent is extended or adjusted under 35 U.S.C. 154(b) by 420 days.

(21) Appl. No.: 16/155,037

(22) Filed: Oct. 9, 2018

(51) Int. Cl.
*G06Q 30/02* (2012.01)
*G06Q 30/00* (2012.01)
*G06Q 30/06* (2012.01)

(52) U.S. Cl.
CPC ....... *G06Q 30/0238* (2013.01); *G06Q 30/018* (2013.01); *G06Q 30/0607* (2013.01)

(58) Field of Classification Search
CPC ....... G06Q 30/02–0277; G06Q 30/018; G06Q 30/0607
See application file for complete search history.

(56) References Cited

U.S. PATENT DOCUMENTS

| 10,290,006 B2 * | 5/2019 | Straus | G06Q 30/02 |
| 2001/0003847 A1 | 6/2001 | Shimazu | |
| 2005/0222900 A1 | 10/2005 | Fuloria et al. | |
| 2005/0228688 A1 * | 10/2005 | Visser | G06Q 10/10 340/691.3 |
| 2005/0240442 A1 | 10/2005 | Lapsker | |
| 2007/0055570 A1 * | 3/2007 | Martin | G06Q 30/02 705/14.41 |

(Continued)

FOREIGN PATENT DOCUMENTS

WO WO-2018118908 A1 * 6/2018 ............. G06F 9/542

OTHER PUBLICATIONS

Walker et al., U.S. Appl. No. 16/017,576, filed Jun. 25, 2018.

(Continued)

*Primary Examiner* — Raquel Alvarez
(74) *Attorney, Agent, or Firm* — Allen, Dyer, Doppelt + Gilchrist, P.A.

(57) ABSTRACT

A system for determining regulatory compliance of a digital promotion may include a user device and a regulatory offers server. The server may obtain, via the user device, a proposed digital promotion associated with a regulated product, a geographic region, and proposed promotional terms. A corresponding legal jurisdiction corresponding to the geographic region may be determined, and if the promotion is compliant based upon the regulations for the corresponding jurisdiction, the proposed promotion, and the proposed promotional terms may be determined. If the promotion is not compliant, the proposed promotional terms may be revised to generate a suggested compliant promotion based upon the regulations for the corresponding jurisdiction. A compliance indication may be communicated to the user device, and when not compliant, the suggested compliant digital promotion may also be communicated.

16 Claims, 6 Drawing Sheets

(56) References Cited

U.S. PATENT DOCUMENTS

| | | | | |
|---|---|---|---|---|
| 2007/0288313 | A1* | 12/2007 | Brodson | G06Q 20/20 |
| | | | | 705/14.17 |
| 2008/0155588 | A1* | 6/2008 | Roberts | G06Q 30/00 |
| | | | | 725/34 |
| 2012/0035957 | A1 | 2/2012 | Hanz et al. | |
| 2012/0130788 | A1* | 5/2012 | Winslade | G06Q 30/02 |
| | | | | 705/14.23 |
| 2012/0246003 | A1 | 9/2012 | Hart et al. | |
| 2014/0279221 | A1* | 9/2014 | Woodward | G06Q 30/0607 |
| | | | | 705/26.25 |
| 2014/0310125 | A1* | 10/2014 | Gopinath | G06Q 30/0607 |
| | | | | 705/26.25 |
| 2015/0065098 | A1* | 3/2015 | Pfau | H04W 4/029 |
| | | | | 455/414.1 |
| 2015/0242883 | A1 | 8/2015 | Setchell et al. | |
| 2016/0042389 | A1 | 2/2016 | Simmons | |
| 2016/0063375 | A1* | 3/2016 | Gilgert | G06Q 30/018 |
| | | | | 706/46 |
| 2016/0350793 | A1* | 12/2016 | Pavlidis | G06Q 30/0238 |

OTHER PUBLICATIONS

STAP on behalf of ELSA project; "Regulations of Alcohol Marketing in 24 European Countries;" https ://ec.europa.eu/health/ph_projects/2004/action3/docs/2004_3 16_frep a2b _en .pdf; 2007; 210 pages.

\* cited by examiner

SYSTEM FOR SUGGESTING COMPLIANT DIGITAL PROMOTION FOR A REGULATED PRODUCT AND RELATED METHODS

TECHNICAL FIELD

The present disclosure is directed to the field of digital promotions, and more particularly, to the field of compliance of a digital promotion for a regulated product and related methods.

BACKGROUND

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

Sales of some products or services may be regulated, for example, by a governmental entity. These regulations may govern how the product may be sold and/or marketed. For example, some regulations may restrict sales of a particular product to certain geographic areas and at certain times. Other restrictions may restrict how a restricted product or service is marketed.

SUMMARY

A system for determining regulatory compliance of a digital promotion may include a user device and a regulatory offers server. The regulatory offers server may include a memory configured to store regulations for a plurality of legal jurisdictions for regulated products, and a processor cooperating with the memory. The processor may be configured to obtain, via the user device, a proposed digital promotion having associated therewith a regulated product, at least one geographic region for the proposed digital promotion, and proposed promotional terms for the proposed digital promotion. The processor may also be configured to determine at least one corresponding legal jurisdiction from the plurality thereof corresponding to the at least one geographic region and determine if the digital promotion for the desired regulated product is legally compliant based upon the regulations for the at least one corresponding legal jurisdiction, the proposed digital promotion, and the proposed promotional terms. If the proposed digital promotion is not legally compliant, the processor may be configured to revise the proposed promotional terms to generate at least one suggested compliant digital promotion based upon the regulations for the at least one corresponding legal jurisdiction. The processor may be configured to communicate an indication of whether the proposed digital promotion is legally compliant to the user device, and when not legally compliant also communicate the at least one suggested compliant digital promotion to the user device.

The proposed promotional terms may include a promotion approval waiting period. The proposed promotional terms may include inclusion of a companion unregulated product, for example.

The processor may be configured to communicate a geographical map for display on the user device. The geographical map may have a first visual characteristic for legally compliant legal jurisdictions and a second visual characteristic for not legally compliant legal jurisdictions, for example. The first and second visual characteristics may include first and second colors, for example.

The processor may be configured to obtain updates to the regulations from a remote server associated with a corresponding legal jurisdiction. The regulated product may include alcohol, for example. The regulated product may include *cannabis*, for example.

A method aspect is directed to a method of determining regulatory compliance of a digital promotion. The method may include using a regulatory offers server that includes a memory configured to store regulations for a plurality of legal jurisdictions for regulated products and a processor cooperating with the memory. The regulatory offers server may be used to obtain, via a user device, a proposed digital promotion having associated therewith a regulated product, at least one geographic region for the proposed digital promotion, and proposed promotional terms for the proposed digital promotion. The regulatory offers server may also be used to determine at least one corresponding legal jurisdiction from the plurality thereof corresponding to the at least one geographic region, and determine if the digital promotion for the desired regulated product is legally compliant based upon the regulations for the at least one corresponding legal jurisdiction, the proposed digital promotion, and the proposed promotional terms.

If the digital promotion is not legally compliant, the regulatory offers server may be used to revise the proposed promotional terms to generate at least one suggested compliant digital promotion based upon the regulations for the at least one corresponding legal jurisdiction. The regulatory offers server may also be used to communicate an indication of whether the proposed digital promotion is legally compliant to the user device, and when not legally compliant also communicate the at least one suggested compliant digital promotion to the user device.

A computer readable medium is directed to a non-transitory computer readable medium for determining regulatory compliance of a digital promotion. The non-transitory computer readable medium includes computer executable instructions that when executed by a processor of a regulatory offers server cause the processor to perform operations. The operations may include obtaining, via a user device, a proposed digital promotion having associated therewith a regulated product, at least one geographic region for the proposed digital promotion, and proposed promotional terms for the proposed digital promotion. The operations may also include determining at least one corresponding legal jurisdiction from a plurality thereof corresponding to the at least one geographic region.

The operations may further include determining if the digital promotion for the desired regulated product is legally compliant based upon regulations for the regulated product for the at least one corresponding legal jurisdiction, the proposed digital promotion, and the proposed promotional terms, and if not legally compliant, revising the proposed promotional terms to generate at least one suggested compliant digital promotion based upon the regulations for the at least one corresponding legal jurisdiction. The operations may further include communicating an indication of whether the proposed digital promotion is legally compliant to the user device, and when not legally compliant also communicate the at least one suggested compliant digital promotion to the user device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
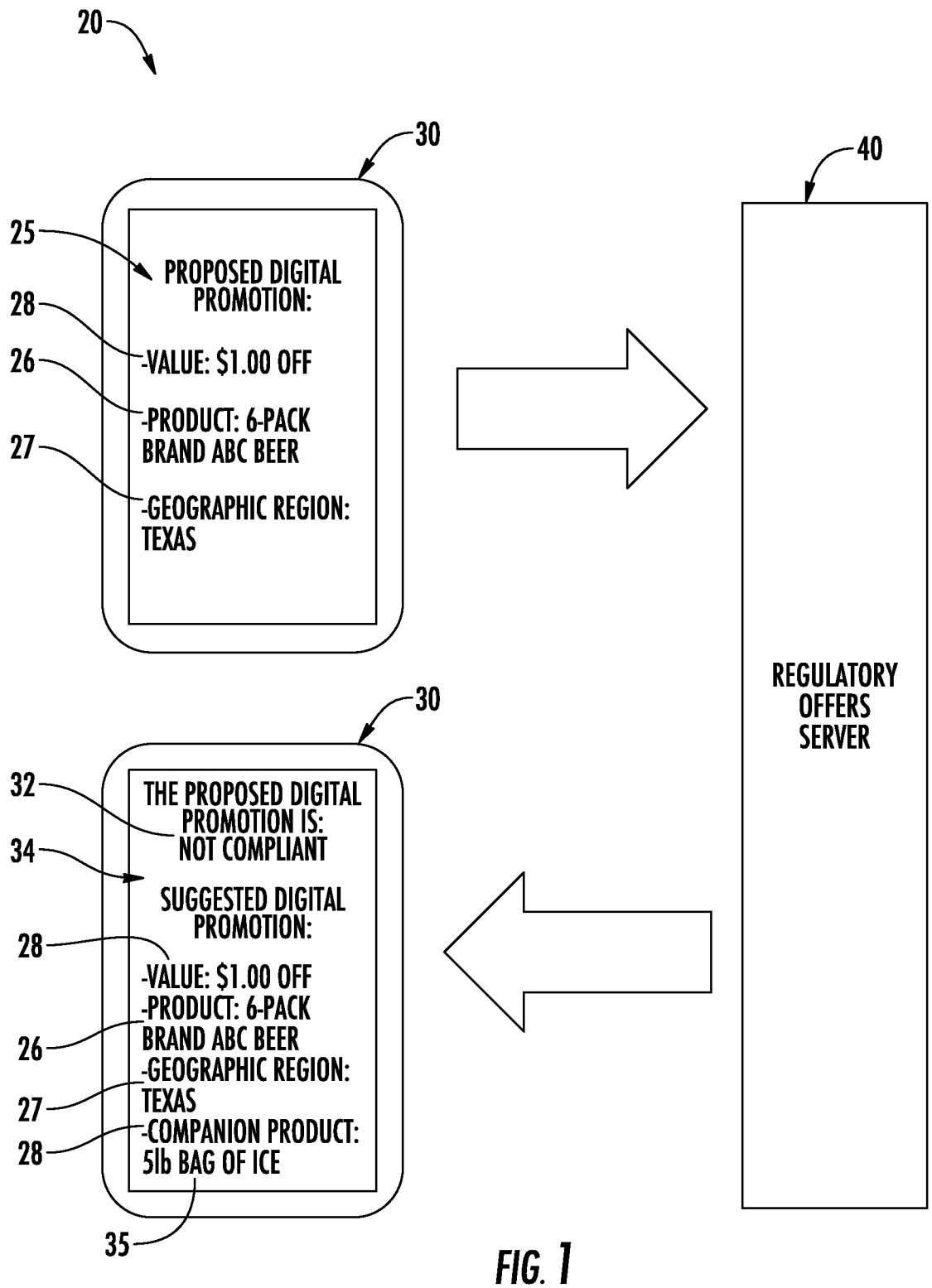
FIG. 1 is a schematic diagram of a system for determining regulatory compliance of a digital promotion in accordance with an embodiment.
Figure 2:
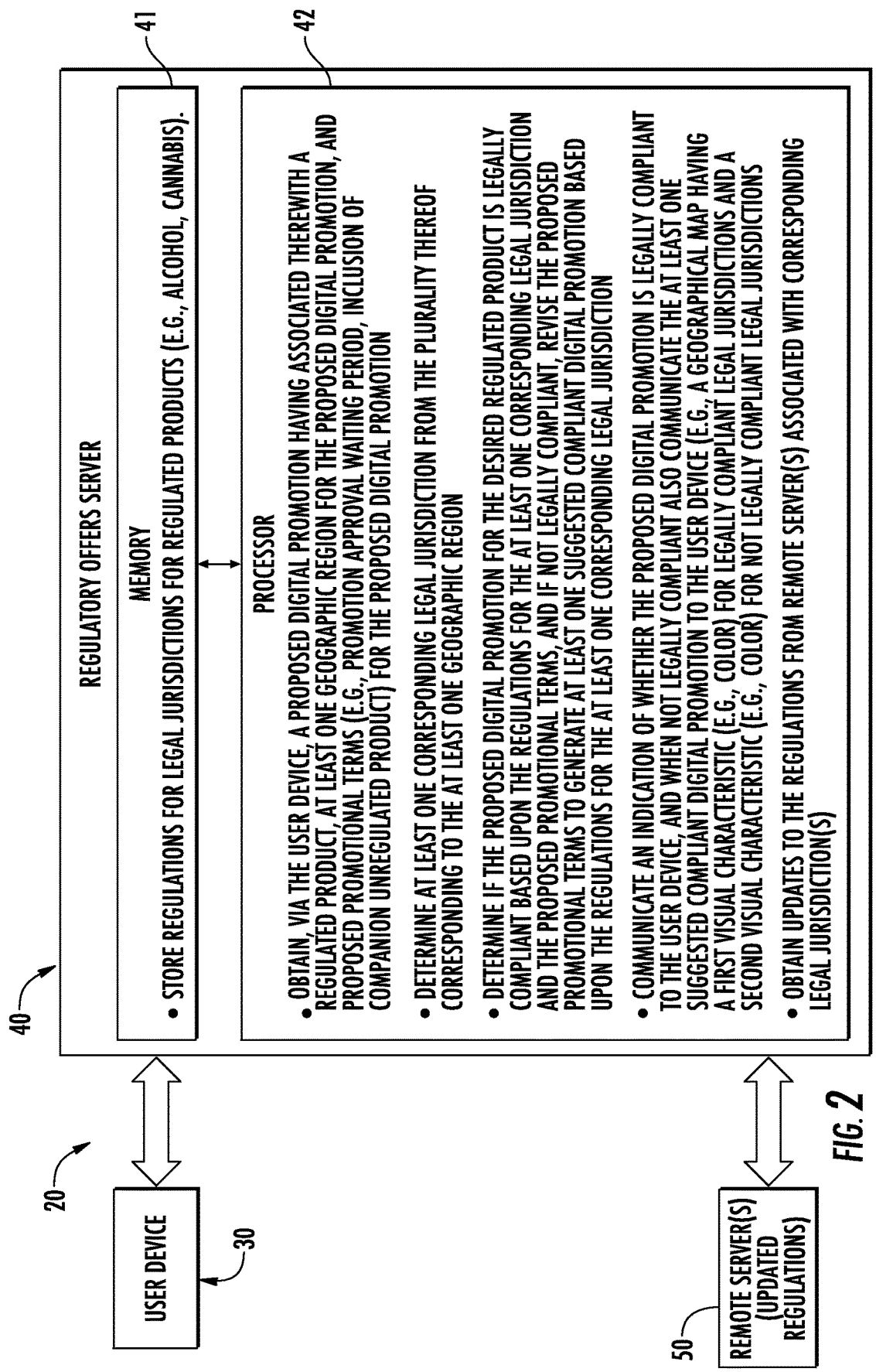
FIG. 2 is a schematic block diagram of a system for determining regulatory compliance of a digital promotion in accordance with an embodiment.
Figure 3:
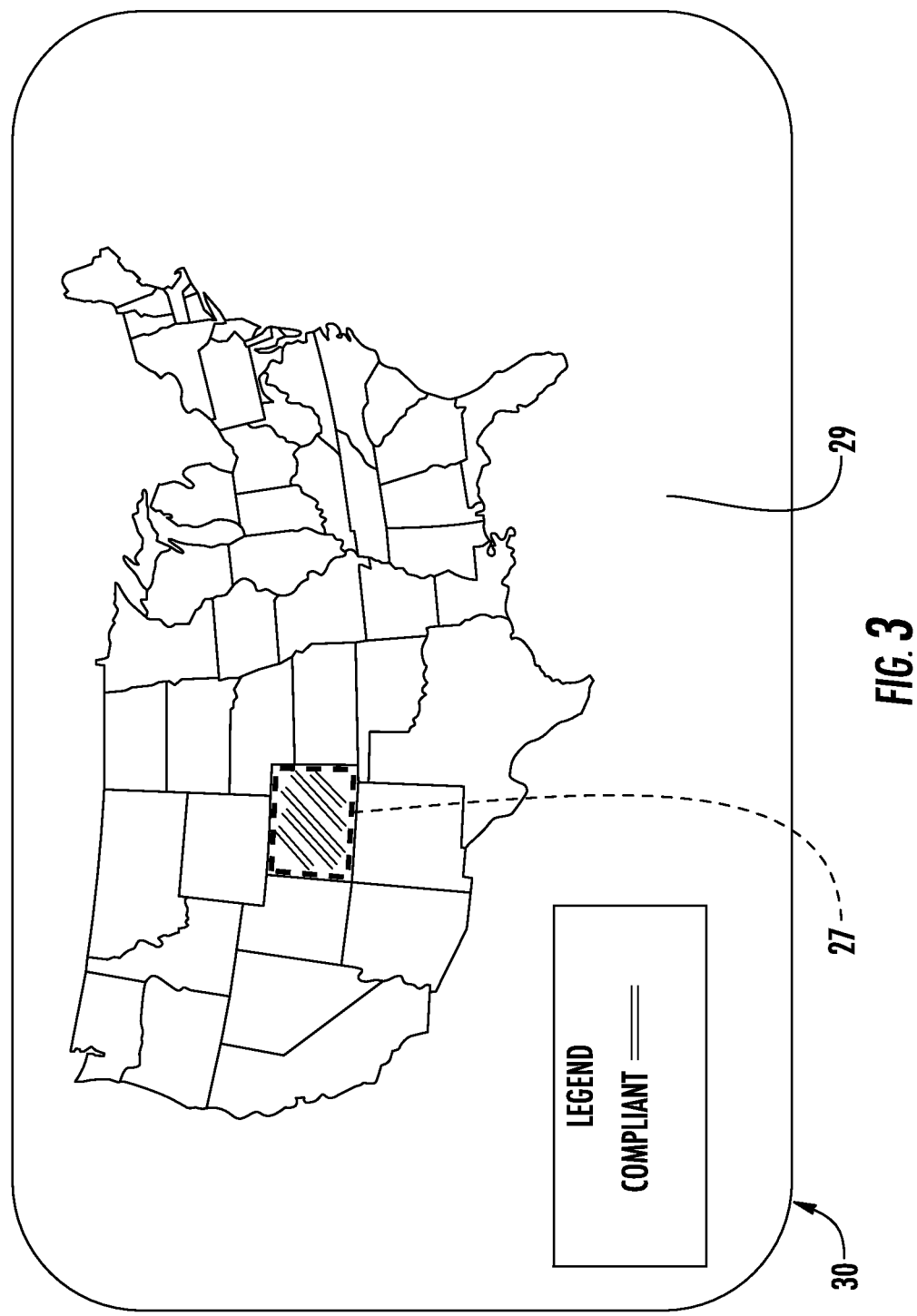
FIG. 3 is a geographical map on a user device communicated from a regulatory offers server of a system for determining regulatory compliance of a digital promotion in accordance with an embodiment.

Referring initially to FIGS. 1-3, a system for determining regulatory compliance 20 of a digital promotion includes a user device 30. The user device 30 may be a personal computer (e.g., desktop or laptop computer), tablet computer, wearable device, or mobile wireless communications device (e.g., a smartphone). The user device 30 communicates, for example, wirelessly over one or more computer networks (e.g., Internet) with a regulatory offers server 40.

The regulatory offers server 40 includes a memory 41 and a processor 42 coupled to the memory. While functions of the regulatory processing server 40 are described herein with respect to the regulatory offers processing server, it will be appreciated by those skilled in the art the memory 41 and the processor 42 cooperate to perform functions described herein.

Figure 4:
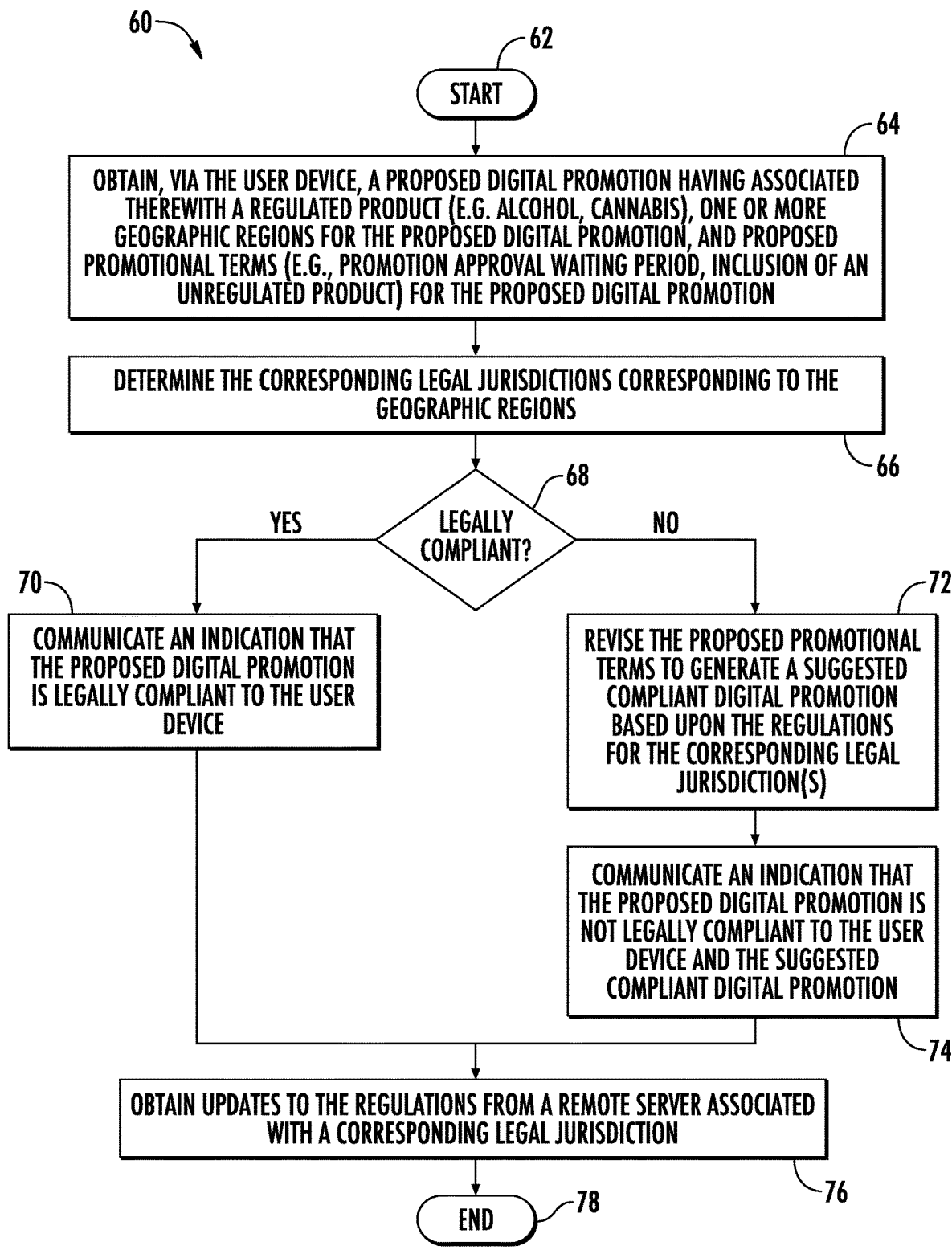
FIG. 4 is a flowchart of operation of a regulatory offers server of a system for determining regulatory compliance of a digital promotion in accordance with an embodiment.

Referring now additionally to the flowchart 60 in FIG. 4, beginning at Block 62, operation of the regulatory offers server 40 with respect to determining regulatory compliance of a digital promotion will now be described.

The memory 41 stores regulations for legal jurisdictions for regulated products. Legal jurisdictions may include states, counties within states, and municipalities, for example. Legal jurisdictions may include other and/or additional geographic, legal, or other jurisdictions. Regulated products may include alcohol and/or *cannabis*, for example. Of course, regulated products may include other and/or additional types of regulated products, for example, drugs (prescription and/or recreational), tobacco, certain food items, etc.

At Block 64 the regulatory offers server 40 obtains, via the user device 30, a proposed digital promotion 25 having associated therewith a regulated product 26, one or more geographic regions 27 for the proposed digital promotion, and proposed promotional terms (e.g., value 28) for the proposed digital promotion. For example, a user, via the user device 30 may provide as input a proposed digital promotion 25 for $1.00 off a 6-Pack of ABC-Brand Beer in the states of Texas or Colorado, the beer being the regulated product 26, Texas and Colorado, the states and their respective counties being the geographic regions 27, and the proposed promotional terms 28 being $1.00 off the 6-Pack and no companion product.

At Block 66, the regulatory offers server 40 determines the corresponding legal jurisdictions, from those stored in the memory 41, corresponding to the (desired) geographic regions 27. In other words, the regulatory offers server 40 determines which legal jurisdictions are applicable to the proposed digital promotion 25 based upon the user selected geographic regions 27.

At Block 68, the regulatory offers server 40 determines if the proposed digital promotion 25 for the desired regulated product 26 is legally compliant based upon the regulations for the corresponding legal jurisdictions and the proposed promotional terms 28. More particularly, the regulatory offers server 40 extracts terms of promotional offers from the regulations and compares these terms to the proposed digital promotion 25. For example, for some legal jurisdictions, a digital promotion for an alcohol product is not permitted at all, may be permitted without jurisdictional approval or review, or may be permitted after jurisdictional (i.e., government) approval. Some legal jurisdictions may permit a digital promotion for an alcohol product so long as it is paired with a non-regulated product, such as, for example, a food item (e.g., chips, ice, etc.).

If, as in the above exemplary proposed digital promotion 25 for a 6-Pack of ABC Brand Beer, the proposed digital promotion is legally compliant for all of Colorado, then the regulatory offers server 40 communicates, for example, via one or more networks, such as the Internet, an indication that the proposed digital promotion is legally compliant to the user device 30 (Block 70). The indication may be in the form of an in-application notification, a badge notification, an email, a short message service (SMS) message, and/or any other type of message.

In some embodiments, the regulatory offers server 40 may alternatively and/or additionally communicate a geographical map 29 for display on the user device 30 (FIG. 3). The geographical map 29 may include one or more visual characteristics indicative of legal compliance in the geographic regions 27. Visual characteristics may include colors (e.g., green for legally compliant), lines, icons, and/or other visual indications, as will be appreciated by those skilled in the art.

If, at Block 68, the regulatory offers server 40 determines that the proposed digital promotion 25 for the desired regulated product 26 is not legally compliant based upon the regulations for the corresponding legal jurisdictions and the proposed promotional terms 28, the regulatory offers server, at Block 72, revises the proposed promotional terms to generate a suggested compliant digital promotion 34 based upon the regulations for the corresponding legal jurisdictions. For example, the regulatory offers server 40 may generate a suggested compliant digital promotion 34 that includes revised promotional terms 28, such as, for example, suggesting a waiting period and/or pairing with a companion unregulated product 35 (FIG. 1).

If, as in the above exemplary proposed digital promotion 25 for a 6-Pack of ABC Brand Beer, the proposed digital promotion is not legally compliant for all of Texas, then the regulatory offers server 40 determines a suggested compliant digital promotion 34 based upon the proposed promotional terms 28 and regulations for the corresponding legal jurisdiction. For example, the regulatory offers server 40 may suggest pairing the 6-Pack of ABC Brand Beer with a 5-pound bag of ice to receive the $1.00 off. In other words, the customer would have to buy both the ABC Brand Beer and the 5-pound bag of ice to receive the $1.00 (i.e., pairing with a companion unregulated product 35).

Figure 5:
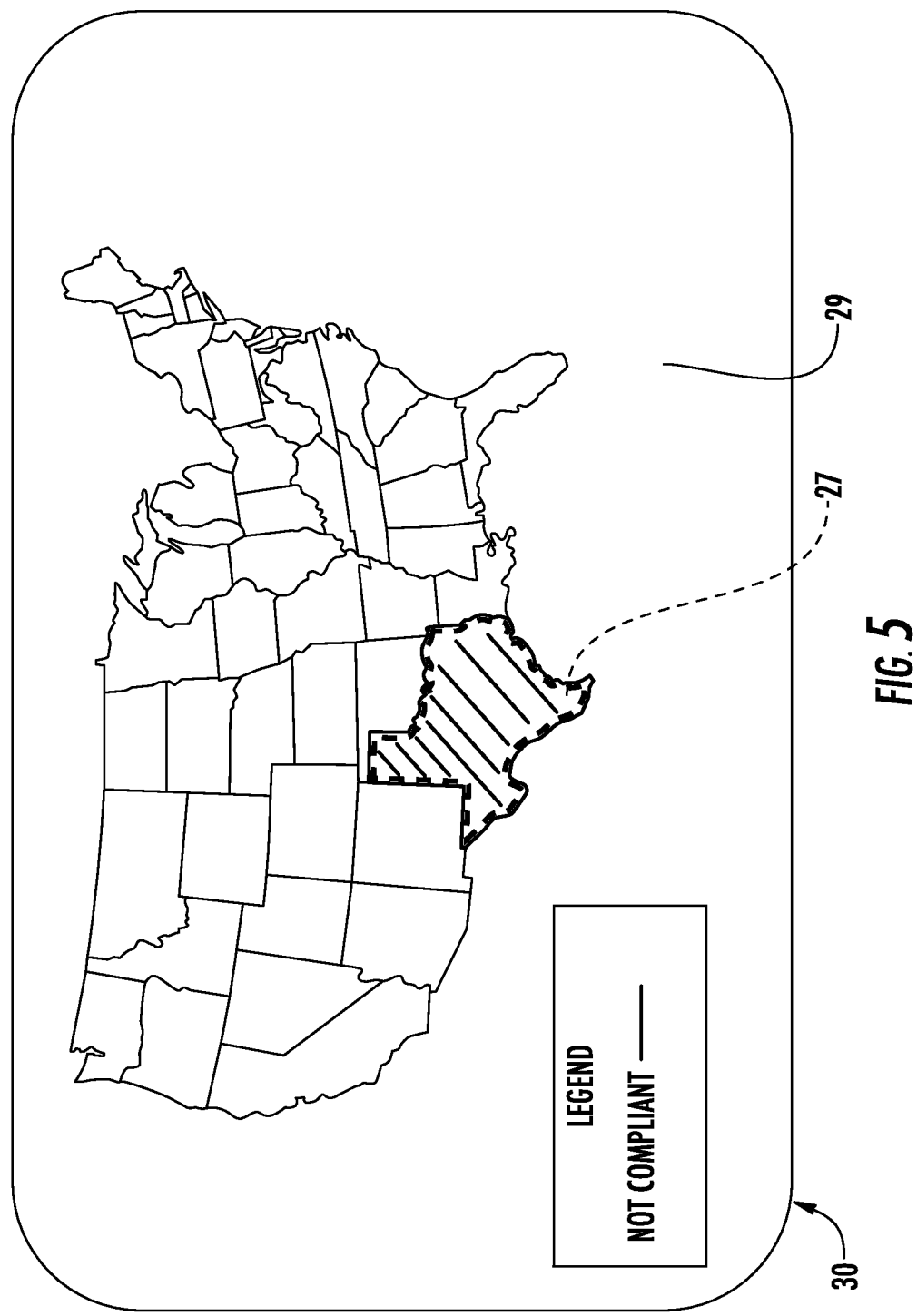
FIG. 5 is a geographical map on a user device communicated from a regulatory offers server of a system for determining regulatory compliance of a digital promotion in accordance with an embodiment.

At Block 74, the regulatory offers server 40 communicates an indication 32 that the proposed digital promotion is not legally compliant to the user device 30 along with the suggested compliant digital promotion 34 to the user device. The regulatory offers server 40 may generate and communicate more than one suggested compliant digital promotion 34 to the user device 30. With respect to the geographical map 29, described above, when the proposed digital promotion 25 is not legally compliant in the geographic region 27, the geographical map 29 may include different visual characteristics (e.g. a red color, different line style, icons, etc.) than for those geographic regions that are legally compliant (FIG. 5).

Figure 6:
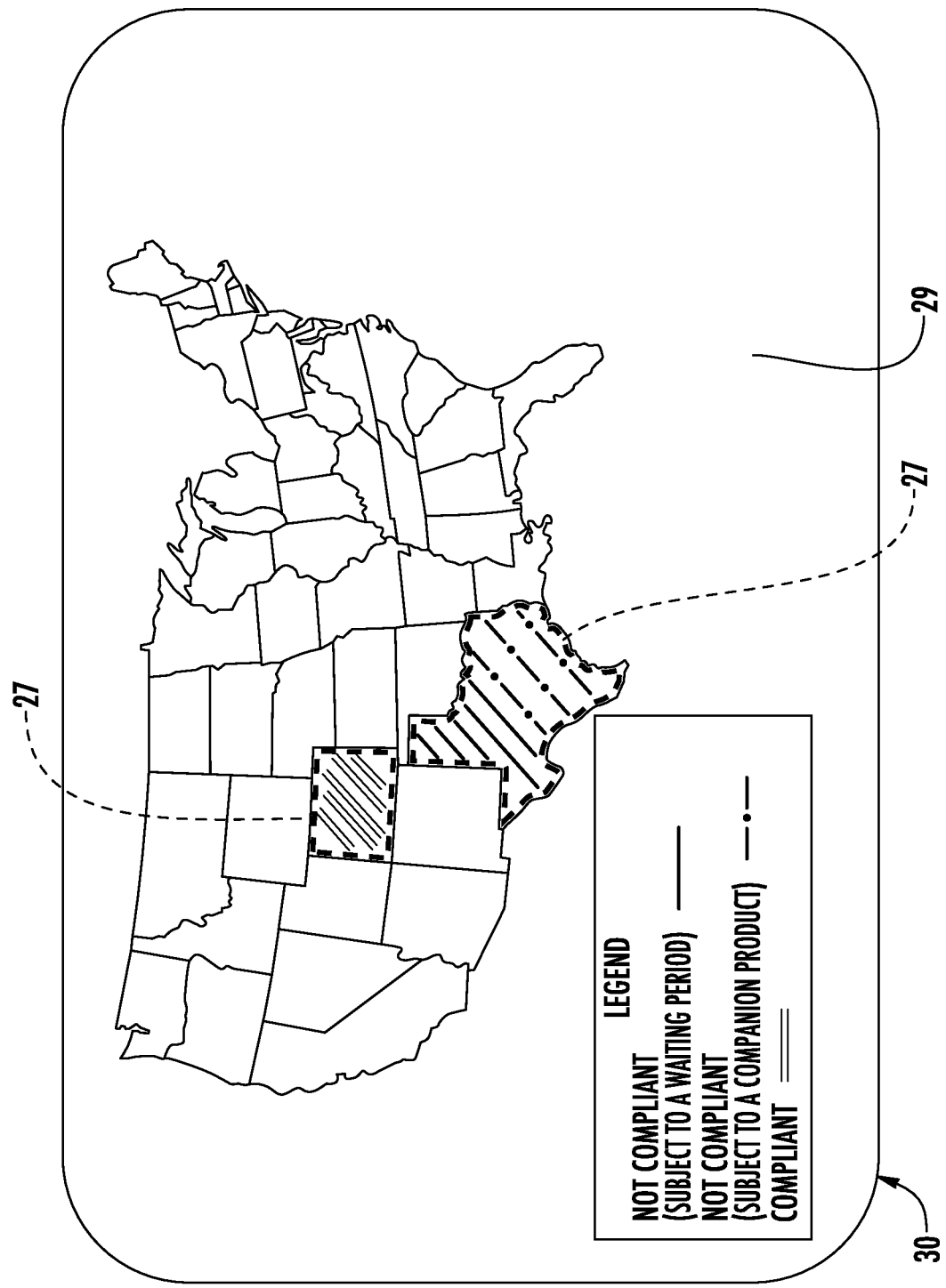
FIG. 6 is a geographical map on a user device communicated from a regulatory offers server of a system for determining regulatory compliance of a digital promotion in accordance with an embodiment.

Referring briefly to FIG. 6, in some embodiments, for example, where there are multiple legal jurisdictions (e.g., counties, municipalities, etc.) within a geographic region 27, the regulatory offers server 40 may communicate the geographical map 29 so that both the legally compliant and not legally compliant jurisdictions for the selected geographic region are displayed on the user device 30. Illustratively, the visual characteristics for the compliant and non-compliant jurisdictions are different. For example, referring to the above example, Colorado and Texas are the geographic region 27, whereby Colorado is legally compliant, while Texas is not legally compliant. Where there are multiple jurisdictions that where the proposed digital promotion is non-compliant, the regulatory offers server 40 may communicate multiple corresponding suggested compliant promotional offers 34.

In some embodiments, the regulatory offers server 40 may obtain and store, for example, in the memory 41, desired fallback terms, for example, from the manufacturer or brand associated with the proposed digital promotion 25. More particularly, the manufacturer or brand may communicate desired unregulated products to the regulatory offers server 40 for use with the suggested compliant digital promotion 34. Such desired unregulated product 26 may be associated with the manufacturer or brand, for example.

In some embodiments, for example, where governmental approval is required for a digital promotion based upon submitted terms of the promotional offer, the regulatory offer may, based upon the proposed digital promotion 25, submit, for example, electronically, the documents for approval to the governing jurisdiction or jurisdictions. During this process, the regulatory offers server 40 may communicate the geographic map 29 so that the visual characteristic of a jurisdiction where approval has been requested shows not-compliant, but pending approval (i.e., visually different than complaint and outright non-compliance).

At Block 76, in some embodiments, the regulatory offers server 40 may optionally obtain updates to the regulations from a remote server 50 associated with a corresponding legal jurisdiction. More particularly, the regulatory offers server 40 may communicate, for example, directly, indirectly, by crawling, or other technique, with and/or to obtain updates to the regulations for the corresponding legal jurisdiction. The operations end at Block 78.

It will be appreciated by those skilled in the art that the system 20 and processes described herein may be repeated, for example, on an on-going basis. More particularly, the regulatory offers server 40 may provide an updated determination of legal compliance on an on-going basis and, for example, in real time. In other words, a determination of non-compliance may be updated upon a change in the proposed digital promotion 25 to indicate compliance, and the geographical map 29 may be updated accordingly.

The system 20 advantageously provides a relatively quick and easy visualization of legal compliance of a proposed digital promotion 25. Conventional approaches do not provide any visualization nor provide a relatively quick and easy answer to whether a digital promotion is legally compliant in any one or more selected jurisdictions or geographic regions 27. Indeed, the system 20 addresses these shortcomings of conventional systems or approaches through parsing and analysis and updating of regulations and providing a relatively easy to understand indication of compliance in a short time period.

While exemplary legal examples have been described herein, it should be understood that the examples herein are not based upon actual regulations for any legal jurisdiction.

A method aspect is directed to a method of determining regulatory compliance of a digital promotion. The method includes using a regulatory offers server 40 that includes a memory 41 configured to store regulations for a plurality of legal jurisdictions for regulated products and a processor 42 cooperating with the memory. The regulatory offers server 40 is used to obtain, via a user device 30, a proposed digital promotion 25 having associated therewith a regulated product 26, at least one geographic region 27 for the proposed digital promotion, and proposed promotional terms 28 for the proposed digital promotion. The regulatory offers server 40 may also be used to determine at least one corresponding legal jurisdiction from the plurality thereof corresponding to the at least one geographic region 27, and determine if the digital promotion for the desired regulated product 26 is legally compliant based upon the regulations for the at least one corresponding legal jurisdiction, the proposed digital promotion 25, and the proposed promotional terms 28.

If the digital promotion is not legally compliant, the regulatory offers server 40 is used to revise the proposed promotional terms 28 to generate at least one suggested compliant digital promotion 34 based upon the regulations for the at least one corresponding legal jurisdiction. The regulatory offers server 40 may also be used to communicate an indication 32 of whether the proposed digital promotion 25 is legally compliant to the user device 30, and when not legally compliant also communicate the at least one suggested compliant digital promotion to the user device.

A computer readable medium is directed to a non-transitory computer readable medium for determining regulatory compliance of a digital promotion. The non-transitory computer readable medium includes computer executable instructions that when executed by a processor 42 of a regulatory offers server 40 cause the processor to perform operations. The operations may include obtaining, via a user device 30, a proposed digital promotion 25 having associated therewith a regulated product 26, at least one geographic region 27 for the proposed digital promotion, and proposed promotional terms 28 for the proposed digital promotion. The operations may also include determining at least one corresponding legal jurisdiction from a plurality thereof corresponding to the at least one geographic region 27.

The operations may further include determining if the digital promotion 25 for the desired regulated product 26 is legally compliant based upon regulations for the regulated product for the at least one corresponding legal jurisdiction, the proposed digital promotion, and the proposed promotional terms 28, and if not legally compliant, revising the proposed promotional terms to generate at least one suggested compliant digital promotion 34 based upon the regulations for the at least one corresponding legal jurisdiction. The operations may further include communicating an indication 32 of whether the proposed digital promotion 25 is legally compliant to the user device 30, and when not legally compliant also communicate the at least one suggested compliant digital promotion 34 to the user device.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for determining regulatory compliance of a digital promotion comprising:
    a user device; and
    a regulatory offers server comprising
        a memory configured to store regulations for a plurality of legal jurisdictions for regulated products, and
        a processor cooperating with the memory and configured to
            obtain, via the user device, a proposed digital promotion having associated therewith a regulated product, at least one geographic region for the proposed digital promotion, and proposed promotional terms for the proposed digital promotion, the proposed promotional terms comprising a package configuration, a promotional value, and inclusion of a companion unregulated product,
            determine corresponding legal jurisdictions from the plurality thereof corresponding to the at least one geographic region,
            determine if the proposed digital promotion for the desired regulated product is legally compliant based upon extraction of legally compliant terms of promotional offers from the regulations for the corresponding legal jurisdictions and comparison with the proposed promotional terms,
            communicate a geographical map to the user device for display thereon, the geographical map comprising boundary lines for each of the corresponding legal jurisdictions, and a plurality of visual characteristics indicative of whether the proposed promotional terms are legally compliant or not legally compliant in the corresponding legal jurisdictions,
            for corresponding legal jurisdictions where the proposed digital promotion is not legally compliant, cause the user device to display a first visual characteristic from among the plurality thereof indicative of the proposed promotional terms being not legally compliant and being indicative of which of the proposed promotional terms is causing the proposed digital promotion to be not legally compliant, the first visual characteristics being displayed within the respective boundary lines of the corresponding legal jurisdictions where the proposed digital promotion is not legally compliant,
            revise the proposed promotional terms causing the proposed digital promotion to be not legally compliant to generate at least one suggested compliant digital promotion based upon the regulations for the corresponding legal jurisdictions where the proposed digital promotion is not legally compliant, and
            communicate the at least one suggested compliant digital promotion to the user device, and
            for corresponding legal jurisdictions where the proposed promotional terms are legally compliant, cause the user device to display a second visual characteristic from among the plurality of visual characteristics indicative of the proposed promotional terms being legally compliant, the second visual characteristic being displayed within the respective boundary lines of the corresponding legal jurisdictions where the proposed digital promotion is legally compliant.

2. The system of claim 1 wherein the proposed promotional terms comprise a promotion approval waiting period.

3. The system of claim 1 wherein the first and second visual characteristics comprise first and second colors.

4. The system of claim 1 wherein the processor is configured to obtain updates to the regulations from a remote server associated with a corresponding legal jurisdiction.

5. The system of claim 1 wherein the regulated product comprises alcohol.

6. The system of claim 1 wherein the regulated product comprises *cannabis*.

7. A regulatory offers server for determining regulatory compliance of a digital promotion comprising:
    a memory configured to store regulations for a plurality of legal jurisdictions for regulated products; and
    a processor cooperating with the memory and configured to
        obtain, via a user device, a proposed digital promotion having associated therewith a regulated product, at least one geographic region for the proposed digital promotion, and proposed promotional terms for the proposed digital promotion, the proposed promotional terms comprising a package configuration, a promotional value, and inclusion of a companion unregulated product,
        determine corresponding legal jurisdictions from the plurality thereof corresponding to the at least one geographic region,
        determine if the proposed digital promotion for the desired regulated product is legally compliant based upon extraction of legally compliant terms of promotional offers from the regulations for the plurality of corresponding legal jurisdictions and comparison with the proposed promotional terms,
        communicate a geographical map to the user device for display thereon, the geographical map comprising boundary lines for each of the corresponding legal jurisdictions, and a plurality of visual characteristics indicative of whether the proposed promotional terms are legally compliant or not legally compliant in the corresponding legal jurisdictions, for corresponding legal jurisdictions where the proposed digital promotion is not legally compliant, cause the user device to display a first visual characteristic from among the plurality thereof indicative of the proposed promotional terms being not legally compliant and being indicative of which of the proposed promotional terms is causing the proposed digital promotion to be not legally compliant, the first visual characteristics being displayed within the respective boundary lines of the corresponding legal jurisdictions where the proposed digital promotion is not legally compliant, revise the proposed promotional terms causing the proposed digital promotion to be not legally compliant to generate at least one suggested compliant digital promotion based upon the regulations for the corresponding legal jurisdictions where the proposed digital promotion is not legally compliant, and communicate the at least one suggested compliant digital promotion to the user device, and for corresponding legal jurisdictions where the proposed promotional terms are legally compliant, cause the user device to display a second visual characteristic from among the plurality of visual characteristics indicative of the proposed promotional terms being legally compliant, the second visual characteristic being displayed within the respective boundary lines of the corresponding legal jurisdictions where the proposed digital promotion is legally compliant.

8. The regulatory offers server of claim 7 wherein the proposed promotional terms comprise a promotion approval waiting period.

9. The regulatory offers server of claim 7 wherein the processor is configured to obtain updates to the regulations from a remote server associated with a corresponding legal jurisdiction.

10. The regulatory offers server of claim 7 wherein the regulated product comprises at least one of alcohol and *cannabis*.

11. A method of determining regulatory compliance of a digital promotion comprising:

using a regulatory offers server comprising a memory configured to store regulations for a plurality of legal jurisdictions for regulated products and a processor cooperating with the memory to obtain, via a user device, a proposed digital promotion having associated therewith a regulated product, at least one geographic region for the proposed digital promotion, and proposed promotional terms for the proposed digital promotion, the proposed promotional terms comprising a package configuration, a promotional value, and inclusion of a companion unregulated product, determine corresponding legal jurisdictions from the plurality thereof corresponding to the at least one geographic region, determine if the proposed digital promotion for the desired regulated product is legally compliant based upon extraction of legally compliant terms of promotional offers from the regulations for the corresponding legal jurisdictions and comparison with the proposed promotional terms, communicate a geographical map to the user device for display thereon, the geographical map comprising boundary lines for each of the corresponding legal jurisdictions, and a plurality of visual characteristics indicative of whether the proposed promotional terms are legally compliant or not legally compliant in the corresponding legal jurisdictions, for corresponding legal jurisdictions where the proposed digital promotion is not legally compliant, cause the user device to display a first visual characteristic from among the plurality thereof indicative of the proposed promotional terms being not legally compliant and being indicative of which of the proposed promotional terms is causing the proposed digital promotion to be not legally compliant, the first visual characteristics being displayed within the respective boundary lines of the corresponding legal jurisdictions where the proposed digital promotion is not legally compliant, revise the proposed promotional terms causing the proposed digital promotion to be not legally compliant to generate at least one suggested compliant digital promotion based upon the regulations for corresponding legal jurisdictions where the proposed digital promotion is not legally compliant, and communicate the at least one suggested compliant digital promotion to the user device, and for corresponding legal jurisdictions where the proposed promotional terms are legally compliant, cause the user device to display a second visual characteristic from among the plurality of visual characteristics indicative of the proposed promotional terms being legally compliant, the second visual characteristic being displayed within the respective boundary lines of the corresponding legal jurisdictions where the proposed digital promotion is legally compliant.

12. The method of claim 11 wherein the proposed promotional terms comprise a promotion approval waiting period.

13. The method of claim 11 wherein using the regulatory offers server comprises using the regulatory offers server to obtain updates to the regulations from a remote server associated with a corresponding legal jurisdiction.

14. A non-transitory computer readable medium for determining regulatory compliance of a digital promotion, the non-transitory computer readable medium comprising computer executable instructions that when executed by a processor of a regulatory offers server cause the processor to perform operations comprising:

obtaining, via a user device, a proposed digital promotion having associated therewith a regulated product, at least one geographic region for the proposed digital promotion, and proposed promotional terms for the proposed digital promotion, the proposed promotional terms comprising a package configuration, a promotional value, and inclusion of a companion unregulated product;

determining corresponding legal jurisdictions from a plurality thereof corresponding to the at least one geographic region;

determining if the proposed digital promotion for the desired regulated product is legally compliant based upon extraction of legally compliant terms of promotional offers from regulations for the regulated product for the corresponding legal jurisdictions and comparison with the proposed promotional terms;

communicating a geographical map to the user device for display thereon, the geographical map comprising boundary lines for each of the corresponding legal jurisdictions, and a plurality of visual characteristics indicative of whether the proposed promotional terms are legally compliant or not legally compliant in the corresponding legal jurisdictions;

for corresponding legal jurisdictions where the proposed digital promotion is not legally compliant, causing the user device to display a first visual characteristic from among the plurality thereof indicative of the proposed promotional terms being not legally compliant and being indicative of which of the proposed promotional terms is causing the proposed digital promotion to be not legally compliant, the first visual characteristics being displayed within the respective boundary lines of the corresponding legal jurisdictions where the proposed digital promotion is not legally compliant, revising the at least one of the proposed promotional terms causing the proposed digital promotion to be not legally compliant to generate at least one suggested compliant digital promotion based upon the regulations for the corresponding legal jurisdictions where the proposed digital promotion is not legally compliant, and communicating the at least one suggested compliant digital promotion to the user device; and for corresponding legal jurisdictions where the proposed promotional terms are legally compliant, causing the user device to display a second visual characteristic from among the plurality of visual characteristics indicative of the proposed promotional terms being legally compliant, the second visual characteristic being displayed within the respective boundary lines of the corresponding legal jurisdictions where the proposed digital promotion is legally compliant.

15. The non-transitory computer readable medium of claim 14 wherein the proposed promotional terms comprise a promotion approval waiting period.

16. The non-transitory computer readable medium of claim 14 wherein the operations comprise obtaining updates to the regulations from a remote server associated with a corresponding legal jurisdiction.

\* \* \* \* \*